3,485,892
CATALYST SYSTEM AND PROCESS FOR
POLYMERIZATION OF OLEFINS
William P. Griffin, Jr., Wilmington, Del., and Walter A. Butte, Jr., Chester, Pa., assignors to Sun Oil Company, Philadelphia, Pa., a corporation of New Jersey
Filed Nov. 22, 1967, Ser. No. 685,092
Int. Cl. C07c 3/10
U.S. Cl. 260—683.15                    33 Claims

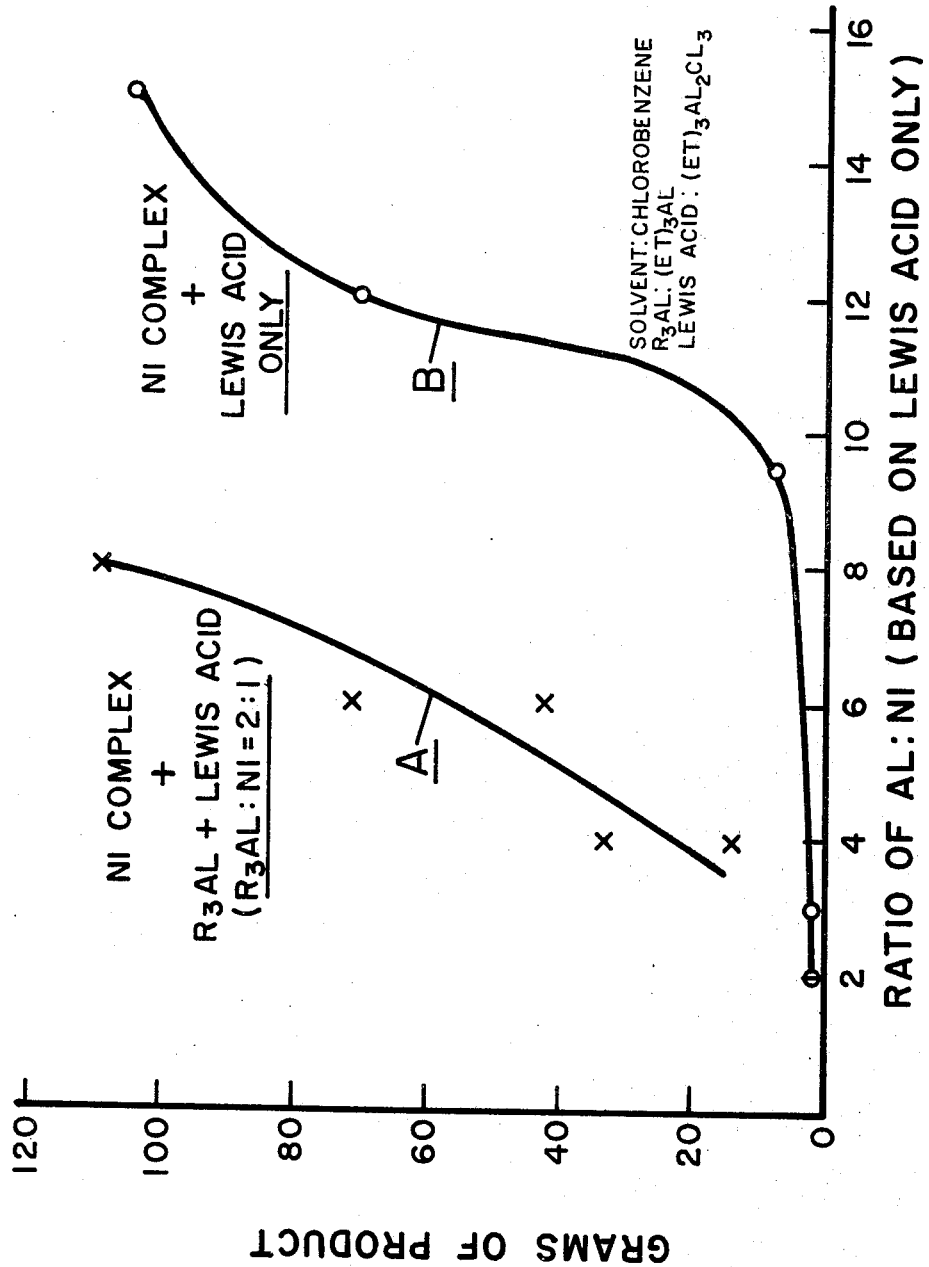

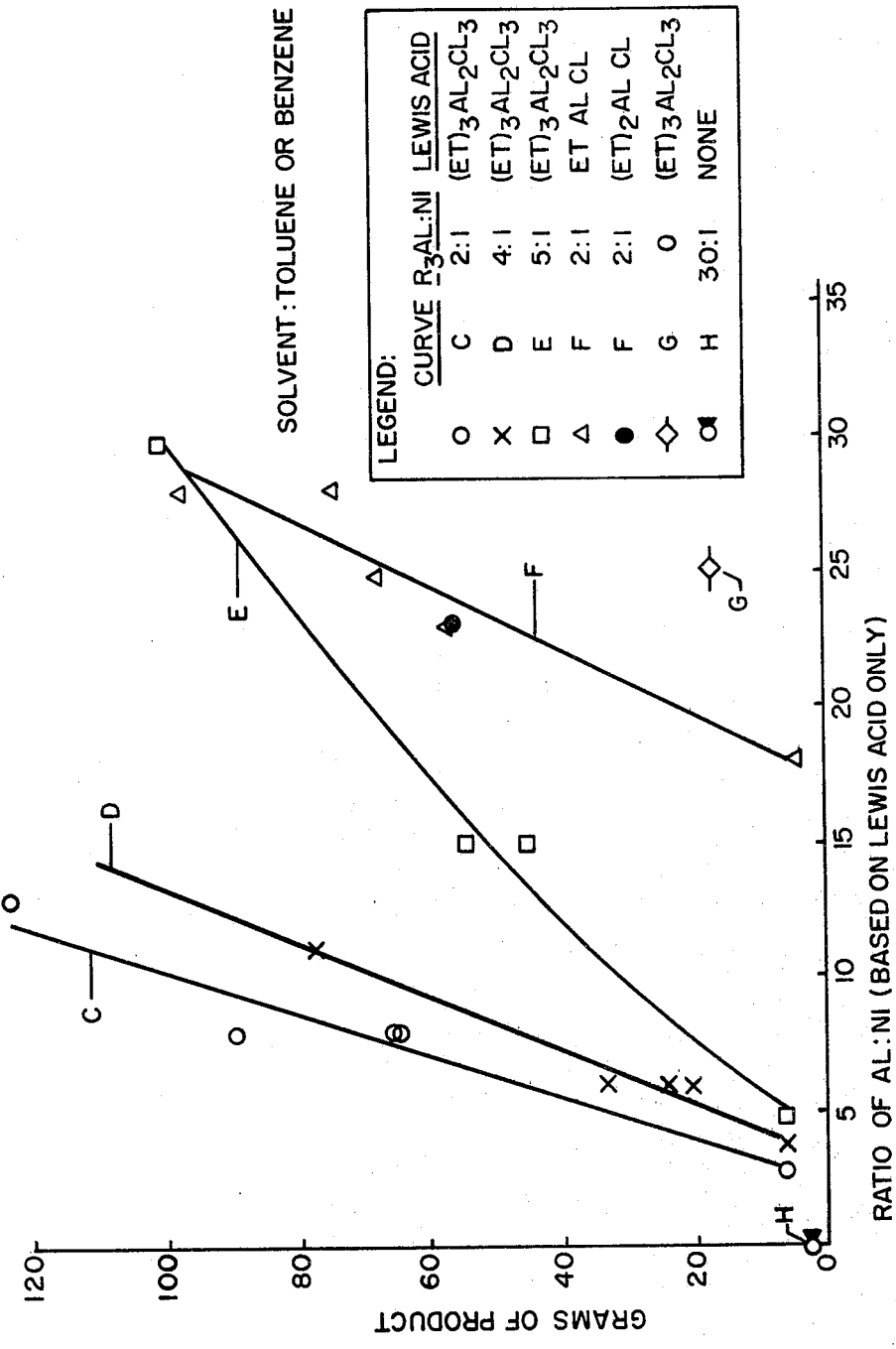

ABSTRACT OF THE DISCLOSURE

Monoolefin hydrocarbons are oligomerized by contact at −100° C. to 200° C., preferably −50° C. to 100° C., with catalyst systems formed by combining (1) certain types of nickel (II) halide phosphine coordination complexes, e.g., $(R_3P)_2NiX_2$, (2) a trihydrocarbyl aluminum $(R_3Al)$ at $R_3Al:Ni$ ratios of at least 0.5:1, preferably 1–4:1, and (3) a Lewis acid which is $RAlX_2'$, $R_3Al_2X_3'$ or $R_2AlX'$ in amount such that the Al:Ni ratio derived from the Lewis acid is in excess of 2:1. The catalyst are used in solution in a suitable liquid medium, e.g., toluene or chlorobenzene, and the products are mainly dimers.

CROSS REFERENCE TO RELATED APPLICATION

Application Ser. No. 675,280, filed Oct. 16, 1967, by Gert G. Eberhardt describes catalyst systems formed by combining (1) certain nickel halide phosphine complexes, e.g., $(R_3P)_2NiCl_2$, with (2) hydrocarbyl aluminum halides, which catalyst systems are highly active for dimerizing olefins. The present invention provides an improvement in catalyst systems involving these types of component, whereby still higher activities are obtained.

BACKGROUND OF THE INVENTION

This invention relates to novel catalyst compositions made from a certain type of nickel (II) complex and to their use in the polymerization of olefinic hydrocarbons. The catalysts are especially useful in the dimerization and/or codimerization of monoolefins.

In the prior art it has been disclosed (Wilke, Angew. Chem. internat. edit. 5, No. 2, 1966, pp. 163–164; Dutch patent application 6,409,179, filed Aug. 10, 1964) that olefins can be oligomerized by means of catalysts formed by combining π-allyl nickel halide phosphine complexes with Lewis acids such as alkyl aluminum dihalides. For example, propylene can be dimerized mainly to 2-methylpentenes by contact with a chlorobenzene solution of a catalyst formed from π-allyl nickel iodide, triphenylphosphine and ethylaluminum dichloride. If tricyclohexylphosphine is used in the mixture in place of triphenylphosphine, the resulting dimer is mainly 2,3-dimethylbutenes.

It has also been disclosed heretofore (Ewers, Angew. Chem., 78. No. 11, 1966, p. 593) that propylene can be dimerized by a catalyst system formed by combining nickel acetylacetonate, triphenylphosphine and a Lewis acid, e.g., ethylaluminum sesquichloride.

The aforesaid Eberhardt application Ser. No. 675,280 describes the dimerization of monoolefins by contacting same with catalyst systems formed by combining certain types of nickel halide phosphine complexes with certain Lewis acids which are hydrocarbyl aluminum chlorides or bromides, being either monohalides, sesquihalides or dihalides $(R_2AlX',\ R_3Al_2X_3'\ or\ RAlX_2')$. The Lewis acid is used in amount such that the Al:Ni ratio in the system is in excess of 2:1 and preferably far in excess thereof, e.g., 10–100:1.

SUMMARY OF THE INVENTION

The present invention constitutes a specific improvement in the kind of catalyst system disclosed in the aforesaid patent application. Preparation of the catalyst involves use of the same two types of components, i.e., the same nickel halide phosphine complexes and the same Lewis acids, but additionally there is incorporated into the catalyst system a third component, namely, a trihydrocarbyl aluminum compound $(R_3Al)$. It has now been found that an unexpected improvement in catalyst efficiency can be obtained by also incorporating into the catalyst system a trihydrocarbyl aluminum compound in amount such that the ratio of $R_3Al:Ni$ is at least 0.5:1 and preferably between 1:1 and 4:1. The most improvement results when the $R_3Al$ compound is admixed with the nickel halide phosphine complex prior to the addition of the Lewis acid.

Catalyst systems prepared according to the invention can be used for oligomerizing monoolefins to products which are mainly dimers. The process is carried out by contacting the olefinic hydrocarbon feed with a solution of the catalyst at a temperature in the range of −100° C. to 200° C., more preferably −50° C. to 100° C., and thereafter recovering the oligmerization product from the solution.

The present catalysts have particular utility in the dimerization of propylene mainly to either dimethylbutenes or methylpentenes depending upon the nature of the hydrocarbyl groups in the phosphine moiety of the catalyst. The invention thus provides, for example, a means of converting propylene into 2,3-dimethylbutene which can be hydrogenated to 2,3-dimethylbutane, an especially valuable component for motor fuel of high antiknock quality.

BRIEF DESCRIPTION OF THE DRAWINGS

The accompanying FIGS. 1 and 2 illustrate the invention as applied to the oligomerization of propylene mainly to dimers utilizing several catalyst compositions according to the invention. Both figures present curves relating the total amount of oligomerization product to the proportion of Lewis acid employed relative to the nickel complex component of the catalyst. The curves are based upon the data presented in the specific examples hereinafter described.

DESCRIPTION OF THE INVENTION

The nickel halide phosphine components of the present catalysts are coordination compounds of nickel (II) corresponding to any of the following formulas:

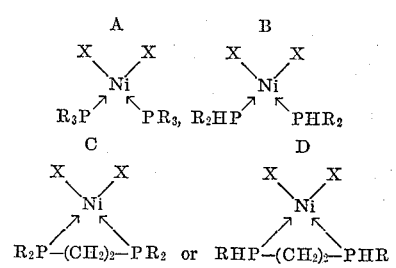

wherein X is chlorine, bromine or iodine. R in all of these formulas represents any hydrocarbyl radical having 1–30 carbon atoms selected from the group consisting of alkyl, cycloalkyl, alkenyl, cycloalkenyl, aryl, aralkyl and aralkenyl. While the R groups can have an important influence on the structure of the dimer product depending on the type of R group present in the coordination complex and also can have an influence with respect to degree of solubility of the resulting catalyst, any R group (or groups) as above specified is (or are) operative for preparing catalyst systems in accordance with the invention. The R groups in the coordination complex employed can be the same or different hydrocarbyl radicals. Of the four types of coordination complexes shown Type A generally is preferred.

The second component of the catalyst system is a trihydrocarbyl aluminum, $R_3Al$, wherein R can be any hydrocarbyl radical as defined above for the phosphine moiety ($PR_3$) of the nickel complex. The R groups of the $PR_3$ moiety and the $R_3Al$ component can be the same or different hydrocarbyl groups, but those of the latter component do not influence the structure of the dimer product as do the R groups of $PR_3$, as discussed more fully hereinafter. It is usually desirable because of availability to use an $R_3Al$ compound having not more than eight carbon atoms in each R group, e.g., trimethyl, triethyl, tributyl or triphenyl aluminum, and especially the lower trialkyl aluminum compounds.

The third component of the present catalyst system is a Lewis acid which is a hydrocarbyl aluminum halide. These Lewis acids include hydrocarbyl aluminum dihalides, hydrocarbyl aluminum sesquihalides and dihydrocarbyl aluminum halides, wherein the halogen is chlorine or bromine. In other words the Lewis acids are of the group $RAlX_2'$, $R_3Al_2X_3'$ and $R_2AlX'$, wherein X is chlorine or bromine and the R's again are any hydrocarbyl radicals having 1–30 carbon atoms selected from the same group as specified above for R.

In order to obtain the maximum improvement in catalyst activity and also in catalyst stability as compared to catalyst systems formulated from only the nickel complex and the Lewis acid, the order of admixing the three components is important. The best procedure is first to add the $R_3Al$ component all in one lot to a solution of the nickel complex while stirring at ambient temperature in the presence of propylene or other olefin to be reacted, whereupon the components react immediately and a color change from red or green to dull yellow occurs. The Lewis acid is then admixed into the solution, preferably being added again all in one lot, whereupon the color becomes a bright yellow which is characteristic of the present catalyst systems. This order of addition of the components gives the highest catalytic activity and also best stability of the catalyst, especially when a hydrocarbon solvent (e.g., toluene) is used in formulating the catalyst system.

It is also permissible to prepare the catalyst by admixing the $R_3Al$ and Lewis acid components with each other and adding the mixture to the nickel complex solution. The resulting catalyst, however, is generally not as active as when the $R_3Al$ component has been added prior to the addition of the Lewis acid. On the other hand, the Lewis acid should not be added before the $R_3Al$ component, since this procedure does not provide the beneficial effect that can otherwise be obtained by incorporating the $R_3Al$ component in the catalyst system. Also the addition of either the $R_3Al$ component or the Lewis acid in several successive portions or continuously over a substantial time period should be avoided, as this tends to give less effective catalyst systems. Instead, all of the $R_3Al$ component should be added at once to the nickel complex solution while vigorously agitating same and thereafter likewise for the Lewis acid.

The present catalysts can be used for converting monoolefins to oligomers which are mainly dimers of the starting olefins. Any such olefins, whether being terminal or internal olefins, can be made to dimerize and/or codimerize by means of these catalysts, provided that the olefin has its double bond between two carbon atoms neither of which is attached to more than one carbon atom. This applies to straight chain and branched aliphatic olefins as well as to cyclic olefins. In other words the present catalysts can be employed for converting to oligomers (mainly to dimers) any monoolefin in which the double bond is between carbon atoms that have no side substituent such as a methyl group or higher side chain. The catalysts are particularly useful for effecting the dimerization or codimerization of $C_2$–$C_{10}$ aliphatic monoolefins, such as the following: ethylene; propylene; butene-1; butene-2; pentene-1; pentene-2; pentene-3; 4-methylpentene-1; 3,3-dimethylbutene-1; 3,4-dimethylpentene-1; octene-1; 2,5-dimethylhexene-3; 4-ethylhexene-2; nonenes; etc. Examples of other olefins that can be made to dimerize by means of the present catalysts are dodecenes; cetenes; eicosenes; docosenes; cyclopentene; cyclohexene; methylcyclohexenes; dimethylcyclohexenes; and cyclooctene; in all of which olefins the carbon atoms forming the double bond have no side substituents. When two or more olefins are present in the charge, codimerization will occur as well as dimerization. Hence, when the term "dimerization" is used herein, it is intended to include codimerization as well if the olefinic charge material contains more than one olefin component.

The dimerization reaction can be carried out by contacting a monoolefin as above specified or a mixture of such olefins with a solution of the catalyst at a temperature in the range of $-100°$ C. to $200°$ C., more preferably $-50°$ C. to $100°$ C. The rate of dimerization at any selected reaction temperature will depend upon the particular olefinic charge employed, and will vary inversely with the molecular weight of the starting olefin. The rate also will depend upon the accessibility of the double bond for contact with the catalyst species. The present catalysts are highly active when used in aromatic hydrocarbon solvents and hence it is usually preferable to employ a solvent such as benzene, toluene or xylene for preparing the catalyst system and carrying out the olefin polymerization reaction. In this respect the catalysts are distinctly advantageous over the catalyst systems of the aforesaid patent application which exhibit much lower activities when a hydrocarbon solvent is employed and, for high activity, need a more expensive solvent such as chlorobenzene. The present catalysts can, if desired, also be prepared and use in chlorobenzene or other halohydrocarbon solvents, and in such cases exhibit still higher activities than the catalysts made without the $AlR_3$ component, as discussed hereinafter in reference to FIG. 1.

The oligomerization of monoolefins by means of the present catalyst can also be effected in many cases without any added solvent by utilizing excess olefin charge material as solvent. When a solvent is not employed and an excess of olefin is used instead as solvent, the R groups in the phosphine portion of the catalyst should contain sufficient carbon atoms to impart thereto substantial solubility in the olefin employed.

The oligomerization product when reacting monoolefins is preponderantly the dimer and/or codimer, or in other words is product resulting from the combination of two molecules of charge olefin per molecule of product. However, minor amounts of higher molecular weight olefins usually are also obtained, perhaps due to interaction of dimer or codimer product with additional charge material or with itself. As a general rule the amount of these higher boiling products can be held to less than 20% by weight of the total olefin reacted by maintaining a relatively high concentration of monomer in the reaction mixture.

The manner in which two molecules of the starting olefin combine to yield the dimer will depend upon the particular R groups in the phosphine component, i.e., the $R_3P$ moiety, of the catalyst system. For example, when propylene is the charge olefin, R groups in the $R_3P$ moiety that impart thereto relatively high electron-accepting character, such as phenyl, tolyl, or naphthyl, tend to result in methylpentenes as the predominant product structure. In such cases the dimerization reaction takes place mainly as follows:

On the other hand, R groups which impart an electron-donating character to the R₃P moiety, such as isopropyl, t-butyl, cyclopentyl or cyclohexyl, tend to cause 2,3-dimethylbutenes to be the main product. In such cases the dimerization reaction proceeds mainly as follows:

Hence the invention allows different specific dimers to be obtained as the major product by appropriate selection of the R groups for the phosphine which forms the R₃P moiety. As a rough indication of the effect of various types of R groups in the phosphine, the following is a listing of R group types in the order generally exhibited for decreasing electron-accepting ability: aryl; aralkenyl; aralkyl; alkenyl; cycloalkenyl; saturated hydrocarbon groups (alkyl or cycloalkyl) attached to the phosphorous atom through a primary carbon atom; and saturated hydrocarbon groups attached to the phosphorous atom through a secondary or tertiary carbon atom. However, this order is subject to variation depending upon the specific hydrocarbon groups involved. For instance, an aralkyl group in which the alkyl moiety is long or an alkenyl group where the double bond is remote from the carbon atom attached to the phosphorous atom can cause the catalyst to function in substantially the same way as if it were prepared from a phosphine in which the R group is alkyl.

The present catalyst, in addition to effecting dimerization, can also cause isomerization of the double bond in the olefinic product and to some extent in the starting olefin. Hence the position of the double bond in the dimer product will depend upon the specific conditions under which the reaction is carried out and particularly the length of time at which the dimer is allowed to remain in contact with the catalyst system. For example, when propylene is dimerized using a catalyst in which the phosphine is triphenylphosphine, the main dimer initially formed is 4-methylpentene-2; but if this is allowed to remain in contact with the catalyst for substantial time, it tends to isomerize to other methylpentenes. When tricyclohexylphosphine is used instead, the main initial dimer is 2,3-dimethylbutene-1, but continued contact of this product with the catalyst tends to cause isomerization to 2,3-dimethylbutene-2. Prolonged contact of the product with the catalyst system after the charge olefin has been consumed can also cause part of the product to dimerize and yield products of still higher molecular weight.

When the desired product from propylene dimerization is 2,3-dimethylbutene, it is best that all R groups in the R₃P moiety of the nickel complex used to form the catalyst be saturated hydrocarbon groups attached to the phosphorous through a secondary or tertiary carbon atom. Also, when a halohydrocarbon (e.g., chlorobenzene) is used as solvent, the reaction temperature for producing this particular dimer should be below 25° C., e.g., 0° C. or lower, since the selectivity for its production from propylene with a halohydrocarbon solvent in the system becomes poorer as the temperature increases. On the other hand, when a hydrocarbon solvent (e.g., toluene) is used, the selectivity for producing 2,3-dimethylbutene does not change to any large extent with temperature and hence higher temperatures (e.g., 50° C.) are quite satisfactory. This lack of temperature sensitivity in production of 2,3-dimethylbutene from propylene when employing hydrocarbon solvents is still another advantage of the present catalysts over those described in the aforesaid patent application.

The present catalysts cannot be used in the presence of highly polar compounds. Solvents which have high dipole moments, such as alcohols, ketones, esters, amines, dioxane and tetrahydrofuran, would irreversibly coordinate with the nickel and deactivate the catalyst and hence must be avoided. Air or oxygen likewise should be excluded from the system. Solvents employed and olefin feedstocks should be substantially anhydrous.

As stated above, the present catalysts can be used both in halohydrocarbon solvents and in hydrocarbon solvents. The highest catalytic activity is obtained in solvents which are halogenated aliphatic and aromatic compounds in which the halogen is chlorine, bromine, fluorine or combinations of such substituents. However, the present catalysts exhibit such high activity in aromatic hydrocarbon solvents that it is generally more advantageous to use this type of solvent rather than the more expensive halohydrocarbons. Liquid aliphatic hydrocarbons can also be employed as solvents when the catalysts components used have sufficient solubility therein, but the resulting catalyst systems generally have substantially lower activities than when aromatic hydrocarbon solvents are used.

In cases where it is desired to obtain the highest catalytic activity by employing a halohydrocarbon as the solvent, the types of halohydrocarbons that are suitable as the solvent medium are halobenzenes having 1–2 halogen atoms, trihaloethanes, tetrahaloethanes, trihaloethylenes and tetrahaloethylenes, in which halohydrocarbons the halogen can be chlorine, bromine or fluorine or combinations of such substituents. Particularly suitable solvents are the monohalobenzenes, viz., chlorobenzene, bromobenzene and fluorobenzene, and dihalobenzenes which are liquid at the reaction temperature such as ortho- and meta-dichlorobenzene, dibromobenzenes or difluorobenzenes. Examples of other halohydrocarbons that can be used are: methyl chloroform; methyl bromoform; 1,1,2-trichloroethane; 1,1,2,2-tetrachloroethane; trifluoroethanes; tribromoethanes; chlorodifluoroethanes; trichlorotrifluoroethanes; tetrafluoroethanes; and similar ethylene derivatives containing 2–4 halogen atoms which are chlorine, bromine and/or fluorine. Many other halogenated hydrocarbon solvents can also be used.

In formulating the catalyst system preparatory to carrying out the dimerization reaction, a nickel coordination complex of types A, B, C or D as above specified is first prepared. Such nickel halide phosphine complexes are known and are described in Advances in Inorganic and Radiochemistry, vol. 6, pp. 27–30, Academic Press (1964). They can be made by dissolving the chloride, bromide or iodide of nickel (II) in an alcohol and adding a stoichiometric amount of the phosphine. The coordination complex forms readily and precipitates, and it is recovered by filtering the mixture and drying the residue. For the present purpose it is distinctly preferable to use either the chloride or bromide of nickel (II) to make the complex.

The following are some specific illustrations of coordination complexes prepared in this manner, in which R is phenyl and X is chlorine:

Type A

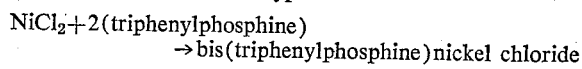

Type B

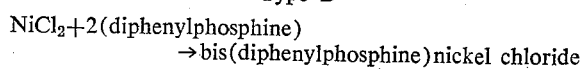

Type C

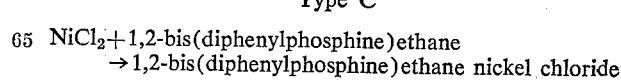

Type D

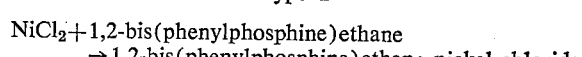

The bis-phosphines used in preparing the complexes of types C and D are chelating phosphines and the resulting chelate complexes likewise are known compounds as can be seen from the reference referred to above.

The so-prepared coordination complex is dissolved in a solvent as described above, the solution is purged with dry nitrogen, preferably some amount of olefin is incorporated in the mixture, e.g., by applying a propylene pressure to the system, and while the mixture is being stirred the $R_3Al$ component is then added preferably all at one and in amount to provide a molar ratio of $R_3Al:Ni$ of at least 0.5:1. The optimum $R_3Al:Ni$ ratio may vary considerably depending upon the particular olefin which is to be dimerized, the solvent being employed and the Lewis acid to be used. Generally, when propylene is the feed olefin, the best $R_3Al:Ni$ ratio falls in the range of 1:1 to 4:1 and usually at about 2:1. In some cases, however, $R_3Al:Ni$ ratios up to 10:1 or 20:1 can be desirable. The foregoing mixing can conveniently be done at room temperature, and addition of the $R_3Al$ component will not cause any appreciable exotherm.

After the $R_3Al$ component has been incorporated in the system, the Lewis acid is added while stirring the mixture and preferably all at once, and a strong exotherm occurs due to reaction of the olefin. It is desirable to provide cooling means in order to control the temperature as desired. The Lewis acid, which as previously stated is $RAlX_2'$, $R_3AlX_3'$ or $R_2AlX'$ and preferably is the sesquihalide, is added in a proportion such that it provides in excess of two atoms of aluminum per atom of nickel in the coordination complex. Preferably the proportion of Lewis acid to the complex is well in excess of this proportion and such that the Al:Ni ratio, based on the Lewis acid only, is in the range 5:1 to 100:1 and more preferably 10:1 to 30:1. The excess Lewis acid over the 2:1 ratio develops the active catalyst species more completely and also acts as a scavenger for impurities, such as moisture and oxygen, which may be present in the system. A large excess of the Lewis acid also is particularly important when an iodide of nickel has been used to prepare the coordination complex (i.e., where X is iodine), as development of the active catalyst depends upon chlorine or bromine being interchanged with iodine upon addition of the Lewis acid. A large excess of the Lewis acid aids this interchange.

Application of the catalyst, prepared as above described, for dimerizing olefins, can be effected merely by contacting the catalyst solution, which has a typical bright yellow color, with the olefin at any temperature in the range of $-100°$ C. to $200°$ C. that provides a suitable rate of reaction. As previously stated, any monoolefin which has no side substituents at the carbon atoms which form the double bond can be made to dimerize by means of these catalysts. Suitable temperatures of reaction will depend upon the reactivity of the particular monomer being charged. The reaction occurs in solution. Hence, when the starting olefin would otherwise be gaseous at the reaction temperature selected, sufficient pressure should be maintained to give it substantial solubility in the catalyst solution and the olefin should be added to maintain the pressure as the reaction proceeds.

When the charge is one or more aliphatic olefins of the $C_2$-$C_{10}$ range, a temperature in the range of $-50°$ C. to $100°$ C. generally is preferred and usually a temperature in the range of $20$-$75°$ C. is most convenient. With the lower olefins sufficient pressure and also adequate agitation are used so that the gaseous feed will rapidly dissolve in the solution so as to maintain an adequate concentration thereof as the reaction proceeds. When propylene is the feed olefin and the desired dimerization product is 2,3-dimethylbutene, the present catalysts are distinctly advantageous over those of the aforesaid patent application which contain no $R_3Al$ component. Whereas those prior catalysts need to be used at relatively low temperature such as $0$-$10°$ C. or lower to obtain good yields of 2,3-dimethylbutene, the present catalysts can be used at room temperature or higher (e.g., $75°$ C.) for this purpose without any noticeable loss in yield of 2,3-dimethylbutene. Thus not only can inexpensive hydrocarbon solvents be employed but excessive refrigeration cost can be avoided while still securing maximum yield of 2,3-dimethylbutene.

The dimerization reaction can be carried out batchwise or in continuous manner if moisture, air and other catalyst poisons are rigorously excluded. In the latter case the catalyst solution can be circulated through a contact zone, such as a tank or column, to which the olefin as either a gas or liquid can be continuously or intermittently fed. The reaction zone is maintained at the desired reaction temperature by cooling or heating as required. A stream of catalyst solution containing the reaction product is withdrawn from the contact zone and is introduced into a distillation zone to strip out the reaction product including dimer and any higher boiling material that may have been formed. When operating in this manner a solvent should be selected with a sufficiently high boiling point so that the reaction product can readily be distilled therefrom, leaving as bottoms a solvent solution of the catalyst. This catalyst solution is recycled to the contact zone for reuse.

When the olefin charge is contacted in gaseous form with the catalyst solution, as normally will be the case when a lower olefin is used such as ethylene, propylene or butenes, the reaction rate will depend not only on the temperature selected but also on the gas pressure, since the pressure will determine the concentration level of the gas dissolved in the solvent for contact with the catalyst. The pressure can be regulated to achieve the rate of dimerization desired. As previously mentioned, the catalyst also tends to cause isomerization of the double bond position in the dimer product. This reaction, however, is not related to pressure when the process is conducted at a temperature below the boiling point of the dimer. Hence, by carrying out the reaction at a relatively high pressure to effect dimerization at a rapid rate and then removing dimer from the solution soon after it has been formed, isomerization of the product can be minimized. This procedure is advantageous, for example, when it is desired to maximize production of 4-methylpentene-2 from propylene using triphenylphosphine as the $PR_3$ component or of 2,3-dimethylbutene-1 using tricyclohexylphosphine in the catalyst.

In order to illustrate the invention, a series of runs was made with the objective of dimerizing propylene to 2,3-dimethylbutene. In each of these runs the nickel complex was bis(triisopropylphosphine)nickel chloride, hereinafter designated as $(T\ i\text{-}PP)_2NiCl_2$, and the $R_3Al$ component was triethylaluminum, hereinafter $(Et)_3Al$. The runs include examples of three Lewis acids, viz.: $(Et)_3Al_2Cl_3$; $EtAlCl_2$; and $(Et)_2AlCl$. In certain runs the solvent was chlorobenzene, while in the others it was either benzene or toluene which are not specifically identified in the runs since these aromatic hydrocarbon solvents give systems of equivalent catalytic activities. Results are tabulated in Tables I, II and III and have been plotted in FIGS. 1 and 2.

More specifically, the runs that used catalyst systems according to the invention were carried out in the following manner. A 250 ml. flask provided with a mangetic agitator, means for cooling, temperature indicating means, and means for applying and maintaining a regulated pressure of propylene in the flask was used. The flask first was charged with 50 ml. of a 0.0004 molar solution of $(T\ i\text{-}PP)_2NiCl_2$ in the selected solvent (chlorobenzene, benzene or toluene) and nitrogen was bubbled through the solution for 10 minutes to effect deaeration. Propylene pressure of 100 mm. Hg above atmospheric pressure was next applied, and then while the mixture was being stirred at room temperature the $(Et)_3Al$ was added as a heptane solution in amount to provide a selected ratio of $(Et)_3Al:Ni$ as indicated in the tables and drawings. No noticeable exotherm occurred but the color of the mixture immediately became dull yellow. With stirring continued, the mixture was then cooled to 10° C. and a heptane solution of the Lewis acid was added in amount to provide Al:Ni ratios as indicated in the tables and drawings. This caused a strong exotherm as propylene reacted, and the color changed to bright yellow. Thereafter the temperature was reduced to and maintained at about 0° C. by cooling, propylene was continuously fed into the flask to maintain the pressure at 100 mm. Hg and the reaction was allowed to proceed until the catalyst had substantially lost its activity. This occurred at times generally in the range of 10–30 minutes after addition of the Lewis acid. When the reaction had essentially ceased, a small amount of aqueous alcohol was added to the mixture to insure complete reactivation. The grams of total product formed in each run were determined and the product was analyzed by VPC analysis. The analytical results showed the percent dimer ($C_6^=$) and percent trimer ($C_9^=$) in the product, and the 2,3-dimethylbutene (2,3-DMB) content of the dimer fraction.

In addition to the runs specifically illustrating the invention, several runs were made for purpose of comparison in which the Lewis acid without the $R_3Al$ component, as well as the $R_3Al$ component without the Lewis acid, was used. These runs were made in substantially the same way as above described except that one or the other of the catalytic components was omitted.

The runs listed in the tables and plotted in the drawings can be grouped as follows:

Runs 1–5

These are runs made with chlorobenzene as solvent, with an $(Et)_3Al$:Ni molar ratio of 2:1 in each run, with $(Et)_3Al_2Cl_3$ as the Lewis acid, and with various ratios of Al:Ni (based on the Lewis acid only) as shown in Table I and Curve A of FIG. 1.

Runs 6–10

These runs are included for purpose of comparison with Runs 1–5. The also were made with chlorobenzene and with $(Et)_3Al_2Cl_3$ at various Al:Ni ratios, but no $R_3Al$ component was employed. Results are given in Table I and Curve B of FIG. 1.

Runs 11–15

These were made in the same way as Runs 1–5 except that toluene or benzene was used instead of chlorobenzene as solvent. In each run the ratio of $(Et)_3Al$:Ni again was 2:1. Results are shown in Table II and are plotted as Curve C of FIG. 2.

Runs 16–20

These were made in the same way as Runs 11–15 but with an $(Et)_3Al$:Ni of 4:1. Table II and Curve D of FIG. 2 show the results.

Runs 21–24

These runs are like Runs 11–20 except that the $(Et)_3Al$:Ni ratio was increased to 5:1. Results are shown in Table II and Curve E of FIG. 2.

Runs 25–29

These runs were made with benzene or toluene as solvent, an $(Et)_3Al$:Ni ratio of 2:1 and with $EtAlCl_2$ as the Lewis acid to provide the various Al:Ni ratios indicated in Table III and Curve F of FIG. 2.

Run 30

This run was made in the same manner as Run 26 except that the Lewis acid used was $Et_2AlCl$. Table III and Curve F of FIG. 2 give the results.

Run 31

This run is included for purpose of comparison and does not involve any $R_3Al$ component in the catalyst system. The solvent was benzene or toluene, the nickel complex was the same as in all preceding runs, i.e., (T i-PP)$_2$NiCl$_2$, and the Lewis acid was $(Et)_3Al_2Cl_3$ used in amount to provide an Al:Ni ratio of 25:1. Results are shown in Table III and are plotted as Point G in FIG. 2.

Run 32

This is another comparative run to show the effect of using $(Et)_3Al$ in combination with the same nickel complex but without any Lewis acid component. The molar ratio of $(Et)_3Al$:Ni was 30:1. Results are given in Table III and plotted as Point H in FIG. 2.

TABLE I.—OLIGOMERIZATION OF PROPYLENE

Solvent: chlorobenzene
Lewis acid: $(Et)_3Al_2Cl_3$
Nickel complex: (T i-PP)$_2$NiCl$_2$
Temperature: 0° C.
Propylene press.: 100 mm. Hg

| Run No. | Al:Ni ratio [1] | $(Et)_3Al$:Ni ratio | Total product, g. | Avg. reaction rate [2] | Dimer Fraction ($C_6^-$) Percent of total product | Dimer Fraction ($C_6^-$) 2,3-DMB [3] content, percent | Percent trimer ($C_9^-$) |
|---|---|---|---|---|---|---|---|
| 1 | 4 | 2:1 | 14 |  | 90 | 83 | 10 |
| 2 | 4 | 2:1 | 33 | 160 | 90 | 81 | 10 |
| 3 | 6 | 2:1 | 42 | 100 | 93 | 83 | 7 |
| 4 | 6 | 2:1 | 71 | 103 | 89 | 79 | 11 |
| 5 | 8 | 2:1 | 109 | 96 | 91 | 81 | 9 |
| 6 | 2 | 0 | 1.3 |  |  |  |  |
| 7 | 3 | 0 | 1.4 |  |  |  |  |
| 8 | 9.5 | 0 | 7 |  |  |  |  |
| 9 | 12 | 0 | 70 | 240 | 90 | 85 | 10 |
| 10 | 15 | 0 | 104 | 264 | 87 | 89 | 13 |

[1] Based on the Lewis acid only.
[2] Kg. of propylene reacted/g. of nickel/hr.
[3] 2,3-dimethylbutenes.

The data given in Table I are plotted in FIG. 1 which shows the relationship between the amount of total product and the atomic ratio of Al:Ni based on only the aluminum contributed by the Lewis acid component. Curve A shows that when the catalyst included the $R_3Al$ component, a rapid increase in the product yield was obtained at Al:Ni ratios above 4. On the other hand Curve B shows that when the $R_3Al$ component was omitted, a considerably higher proportion of the Lewis acid was needed (Al:Ni above 10) before a similar increase in product yield was obtained. This means that for a given product yield, less total aluminum per gram of nickel need be used for the Curve A catalyst system than for the Curve B system. In other words higher catalytic efficiency per gram of total aluminum employed is achieved when the catalyst includes both the $R_3Al$ and the Lewis acid than when the $R_3Al$ component is omitted. The data listed in Table I show that both systems gave 2,3-dimethylbutenes as the main dimerization product and in approximately comparable concentrations in the dimer fraction.

TABLE II.—OLIGOMERIZATION OF PROPYLENE

Solvent: benzene or toluene
Lewis acid: $(Et)_3Al_2Cl_3$
Nickel complex: $(T\ i\text{-}PP)_2NiCl_2$
Temperature: 0° C.
Propylene press.: 100 mm. Hg

| Run No. | Al:Ni ratio [1] | $(Et)_3Al$:Ni ratio | Total product, g. | Avg. reaction rate [2] | Dimer Fraction ($C_6^=$) Percent of total product | Dimer Fraction ($C_6^=$) 2,3-DMB [3] content, percent | Percent trimer ($C_9^=$) |
|---|---|---|---|---|---|---|---|
| 11 | 3 | 2:1 | 6 | | | | |
| 12 | 8 | 2:1 | 65 | 233 | 89 | 79 | 11 |
| 13 | 8 | 2:1 | 66 | 200 | 94 | 76 | 6 |
| 14 | 8 | 2:1 | 90 | 140 | 92 | 73 | 8 |
| 15 | 13 | 2:1 | 123 | 125 | 88 | 82 | 12 |
| 16 | 4 | 4:1 | 6 | | | | |
| 17 | 6 | 4:1 | 33 | 160 | 92 | 75 | 8 |
| 18 | 6 | 4:1 | 21 | 150 | 93 | 78 | 7 |
| 19 | 6 | 4:1 | 24 | 120 | 94 | 73 | 6 |
| 20 | 11 | 4:1 | 77 | 162 | 89 | 79 | 11 |
| 21 | 5 | 5:1 | 6 | | | | |
| 22 | 15 | 5:1 | 45 | 161 | 92 | 78 | 8 |
| 23 | 15 | 5:1 | 54 | 135 | 84 | 83 | 16 |
| 24 | 30 | 5:1 | 100 | 105 | 89 | 79 | 11 |

[1] Based on the Lewis acid only.  [2] Kg. of propylene reacted/g. of nickel/hr.

TABLE III.—OLIGOMERIZATION OF PROPYLENE

Solvent: benzene or toluene
Nickel complex: $(T\ i\text{-}PP)_2NiCl_2$
Temperature: 0° C.
Propylene press.: 100 mm. Hg

| Run No. | Lewis acid used | Al:Ni ratio [1] | $(Et)_3Al$:Ni ratio | Total product, g. | Avg. reaction rate [2] | Dimer Fraction ($C_6^=$) Percent of total product | Dimer Fraction ($C_6^=$) 2,3-DMB content, percent | Percent Trimer ($C_9^=$) |
|---|---|---|---|---|---|---|---|---|
| 25 | $EtAlCl_2$ | 18 | 2:1 | 4.5 | | | | |
| 26 | $EtAlCl_2$ | 23 | 2:1 | 57 | 83 | 74 | 81 | 26 |
| 27 | $EtAlCl_2$ | 25 | 2:1 | 68 | 105 | 86 | 82 | 14 |
| 28 | $EtAlCl_2$ | 28 | 2:1 | 74 | 108 | 71 | 81 | 29 |
| 29 | $EtAlCl_2$ | 28 | 2:1 | 97 | 164 | 82 | 85 | 18 |
| 30 | $(Et)_2AlCl$ | 23 | 2:1 | 56 | 177 | 84 | 80 | 16 |
| 31 | $(Et)_3Al_2Cl_3$ | 25 | 0 | 17 | | 61 | 31 | 39 |
| 32 | None | 0 | 30:1 | 2.7 | | | | |

[1] Based on the Lewis acid only.  [2] Kg. of propylene reacted/g. of nickel/hr.

With reference to FIG. 2, Curves C, D and E (based on the data of Table II) show the effect on the relationship of product yield to Al:Ni ratio of varying the $R_3Al$:Ni ratio between 2:1 and 5:1. These curves indicate that for dimerizing propylene in an aromatic hydrocarbon solvent using ethylaluminum sesquichloride as the Lewis acid, the most efficient catalysts are obtained when an $R_3Al$:Ni ratio in the neighborhood of 2:1 is used. Data from Table III are plotted as Curve F which shows, by comparison with Curve C, that the Lewis acids which are $RAlCl_2$ or $R_2AlCl$ are somewhat less efficient than the sesquichlorides but nevertheless form highly active catalysts in combination with $R_3Al$ and the nickel complex. Point G of FIG. 2 (based on Table III) shows that a substantially less effective catalyst is obtained by using only the sesquichloride in combination with the nickel complex. Point H (based on Table III) further shows that combining the $R_3Al$ component with the nickel complex but omitting the Lewis acid results in very little catalytic activity.

From the rate data given in the foregoing tables, it can be seen that the present catalyst systems are highly active in promoting the oligomerization of olefins. The data show that propylene reaction rates of the order of 100–250 kg./g. of nickel/hr. are typical even for the relatively low reaction temperature of 0° C. and low propylene pressure of 100 mm. Hg above atmospheric used in the foregoing examples. By way of comparison, data for propylene dimerization by means of catalysts made from π-allyl nickel halide phosphine complexes, as reported by Wilke in the previously cited Angew. Chem. publication, show reaction rates of about 6 and 13 kg./g. of Ni/hr. at temperatures, respectively, of about −15° C. and 35° C.

Run 33.—Dimerization of ethylene

An autoclave was cooled to about 0° C. and then was charged with the following materials in the order named: 10 ml. of chlorobenzene; 3 ml. of a 0.003 molar chlorobenzene solution of $(T\ i\text{=}PP)_2NiCl_2$; gaseous ethylene to a pressure of 50 p.s.i.g.; 2 ml. of a 0.1 molar heptane solution of $(Et)_3Al$; and 0.5 ml. of a 1.0 molar toluene solution of $(Et)_3Al_2Cl_3$. The ratio of $(Et)_3Al$:Ni was about 22 and the Al:Ni ratio based on the Lewis acid only was about 56. The mixture was continuously stirred and ethylene was pressured into the autoclave to a pressure of 200 p.s.i.g. over a 2 minute period. An immediate exothermic reaction ensued and the temperature rose to and was maintained at about 45° C. for 60 minutes, ethylene being constantly fed into the autoclave as it was being consumed. At the end of that time the reaction was still proceeding but was terminated by the addition of methanol to deactivate the catalyst. 87 g. of ethylene had reacted. Analysis of the product showed that it had the following composition: 79% butenes; 18% hexenes and 3% octenes.

When other Lewis acids corresponding to $R_3AlX_3'$, $RAlX_2'$ or $R_2AlX'$ as herein defined are substituted for the Lewis acids used in the foregoing examples or when other trihydrocarbyl aluminum compounds are substituted for the $(Et)_3Al$ component, substantially equivalent results are obtained. Also the use of phosphines having other R groups as herein specified similarly yields catalysts effective for purposes of the invention. Monoolefin hydrocarbons other than those shown in the foregoing examples can be oligomerized in analogous fashion by means of the present catalysts, provided that the olefin monomer has its double bond between carbon atoms neither of which has a side substituent or, in other words, neither of which is attached directly to more than one carbon atom.

What is claimed is:
1. A catalyst system which is a combination of the following:
(a) a phosphine nickel halide coordination complex having any of the formulas

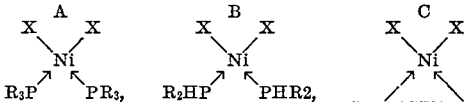

or

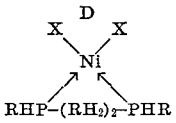

(b) a trihydrocarbyl aluminum of the formula $R_3Al$ in amount such that the ratio of $R_3Al:Ni$ is at least 0.5:1;
(c) and a Lewis acid of the group $RAlX_2'$, $R_3Al_2X_3'$ and $R_2AlX'$ in amount such that the Al:Ni ratio derived from the Lewis acid is in excess of 2:1 and at least twice the Al:Ni ratio derived from the $R_3Al$; in which formulas X is chlorine, bromine or iodine, X' is chlorine or bromine, and R represents hydrocarbon radicals having 1–30 carbon atoms selected from the group consisting of alkyl, cycloalkyl, alkenyl, cycloalkenyl, aryl, aralkyl and aralkenyl; said trihydrocarbyl aluminum having been incorporated at least as early as the Lewis acid into the catalyst system.

2. A catalyst system according to claim 1 wherein said coordination complex has Formula A.
3. A catalyst system according to claim 2 wherein said Lewis acid is $R_3Al_2X_3'$.
4. A catalyst system according to claim 3 wherein X is chlorine or bromine.
5. A catalyst system according to claim 1 wherein said ratio of $R_3Al:Ni$ is in the range of 1:1 to 4:1.
6. A catalyst system according to claim 5 wherein the said Al:Ni ratio is in the range of 5:1 to 100:1.
7. A catalyst system according to claim 6 wherein said Lewis acid is $R_3Al_2X_3'$.
8. A catalyst system according to claim 7 wherein said coordination complex has Formula A.
9. A catalyst system according to claim 1 wherein each R group in the catalyst components has not more than eight carbon atoms.
10. A catalyst system according to claim 9 wherein said ratio of $R_3Al:Ni$ is in the range of 1:1 to 4:1.
11. A catalyst system according to claim 10 wherein the said Al:Ni ratio is in the range of 5:1 to 100:1.
12. A catalyst system according to claim 11 wherein said coordination complex has Formula A.
13. A catalyst system according to claim 12 wherein said Lewis acid is $R_3Al_2X_3'$.
14. A catalyst system according to claim 11 wherein said Lewis acid is $R_3Al_2X_3'$.
15. A catalyst system according to claim 12 wherein each R in said coordination complex is a saturated hydrocarbon group attached to the phosphorous atom through a secondary or tertiary carbon atom.
16. A catalyst system according to claim 12 wherein each R in said coordination complex is an aryl group.
17. A process for oligomerizing monoolefin hydrocarbon which comprises contacting an aliphatic monoolefin hydrocarbon having its double bond between two carbon atoms neither of which is attached to more than one other carbon atom with a liquid solution of a catalyst system as defined in claim 1 and at a temperature in the range of $-100°$ C. to $200°$ C.
18. A process according to claim 17 wherein said temperature is in the range of $-50°$ C. to $100°$ C.
19. A process according to claim 18 wherein said coordination complex has Formula A.
20. A process according to claim 19 wherein said Lewis acid is $R_3Al_2X_3'$.
21. A process according to claim 20 wherein X is chlorine or bromine.
22. A process according to claim 17 wherein said temperature is in the range of $-50°$ C. to $100°$ C., X is chlorine or bromine, and said ratio of $R_3Al:Ni$ is in the range of 1:1 to 4:1.
23. A process according to claim 22 wherein the said Al:Ni ratio is in the range of 5:1 to 100:1.
24. A process according to claim 18 wherein said monoolefin hydrocarbon is a $C_2$–$C_{10}$ aliphatic monoolefin and the reaction product is mainly dimer.
25. A process according to claim 24 wherein said monoolefin is propylene.
26. A process according to claim 24 wherein said coordination complex has Formula A and said Lewis acid is $R_3Al_2X_3'$.
27. A process according to claim 26 wherein said ratio of $R_3Al:Ni$ is in the range of 1:1 to 4:1.
28. A process according to claim 27 wherein said monoolefin is propylene.
29. A process according to claim 28 wherein each R in said coordination complex is a saturated hydrocarbon group attached to the phosphorous atom through a secondary or tertiary carbon atom.
30. A process according to claim 18 wherein said monoolefin hydrocarbon is propylene and the reaction product is mainly dimer.
31. A process according to claim 30 wherein each R in said coordination complex is a saturated hydrocarbon group attached to the phosphorous atom through a secondary or tertiary carbon atom, said ratio of $R_3Al:Ni$ is in the range of 1:1 to 4:1, the said Al:Ni ratio is in the range of 5:1 to 100:1, and the main dimerization product is 2,3-dimethylbutene.
32. A process according to claim 30 wherein each R in said coordination complex is an aryl group, said ratio of $R_3Al:Ni$ is in the range of 1:1 to 4:1, the said Al:Ni ratio is in the range of 5:1 to 100:1, and the main dimerization product is methylpentene.
33. Method of forming a catalyst system as defined in claim 1 which comprises forming a solution of said coordination complex in an aromatic hydrocarbon or halohydrocarbon solvent, first admixing said solution with the $R_3Al$ component in amount such that the $R_3Al:Ni$ ratio is between 0.5:1 and 5:1, and then admixing the resulting mixture with said Lewis acid in amount such that the Al:Ni ratio derived from the Lewis acid is in the range of 5:1 to 100:1 and at least twice the Al:Ni ratio derived from the $R_3Al$.

References Cited
UNITED STATES PATENTS 3,306,948  2/1967  Kealy _____ 260—680
3,355,510  11/1967  Cannell et al. _____ 260—683.15

PAUL M. COUGHLAN, Jr., Primary Examiner

U.S. Cl. X.R.
252—431; 260—666